United States Patent
Tsudaka et al.

(10) Patent No.: US 8,677,367 B2
(45) Date of Patent: Mar. 18, 2014

(54) EXECUTION ORDER DECISION DEVICE

(75) Inventors: Shinichiro Tsudaka, Tokyo (JP); Hideo Nakata, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 3 days.

(21) Appl. No.: 13/144,941

(22) PCT Filed: Mar. 31, 2009

(86) PCT No.: PCT/JP2009/056597
§ 371 (c)(1),
(2), (4) Date: Jul. 18, 2011

(87) PCT Pub. No.: WO2010/113242
PCT Pub. Date: Oct. 7, 2010

(65) Prior Publication Data
US 2011/0276976 A1    Nov. 10, 2011

(51) Int. Cl.
*G06F 9/46* (2006.01)

(52) U.S. Cl.
USPC .......................................................... 718/103

(58) Field of Classification Search
USPC .......................................................... 718/103
See application file for complete search history.

(56) References Cited

U.S. PATENT DOCUMENTS

| | | | |
|---|---|---|---|
| 5,867,716 A | 2/1999 | Morimoto et al. | |
| 2006/0129531 A1* | 6/2006 | Bates | 707/3 |

FOREIGN PATENT DOCUMENTS

| | | | |
|---|---|---|---|
| CN | 86105553 A | 7/1987 | |
| CN | 101073080 A | 11/2007 | |
| JP | 4-252336 | 9/1992 | |
| JP | 5 88869 | 4/1993 | |
| JP | 7 334466 | 12/1995 | |
| JP | 8-96018 | 4/1996 | |
| JP | 2002 149405 | 5/2002 | |
| JP | 2002149405 | * 5/2002 | ......................... 9/44 |
| JP | 2007-226526 | 9/2007 | |

OTHER PUBLICATIONS

Krithi Ramamritham, "Allocation and Scheduling of Complex Periodic Tasks", Jun. 1990, Conference Publication, Distributed Computing Systems, 1990. Proceedings, 10th International Conference on May 28-Jun. 1, 1990, pp. 108-115.*
International Search Report Issued Jun. 30, 2009 in PCT/JP09/056597 filed Mar. 31, 2009.
International Preliminary Report on Patentability and Written Opinion issued Oct. 4, 2011 in PCT/JP2009/056597 (with English translation) (the references cited therein were previously filed on Jul. 18, 2011).
Combined Chinese Office Action and Search Report issued Feb. 20, 2013, in Chinese Patent Application No. 200980157508.X with partial English translation.
Chinese Office Action issued Jul. 4, 2013, in China Patent Application No. 200980157508.X (with English translation).
Chinese Office Action issued on Oct. 10, 2013, in Chinese Patent Appln. No. 200980157508.X (w/partial English translation), pp. 1-15.

* cited by examiner

Primary Examiner — Emerson Puente
Assistant Examiner — Steven Do
(74) Attorney, Agent, or Firm — Oblon, Spivak, McClelland, Maier & Neustadt, L.L.P.

(57) ABSTRACT

An execution sequence decision device is capable of efficiently and appropriately determining the execution sequence of processing modules even in a case where those have a closed circuit in the input/output dependencies. A dependence evaluation sub-unit and an anti dependence evaluation sub-unit evaluate the dependence and anti dependence of each processing module in a processing module group. A priority evaluation sub-unit determines the priority of each processing module in the processing module group based on the dependence and anti dependence. An execution order allocation sub-unit allocates the top of execution sequence to one processing module that has the highest priority obtained by the priority evaluation sub-unit. An execution sequence allocation unit causes the respective sub-units to repeatedly execute the above-mentioned process every time the order of execution sequence of one processing module is determined, and then sequentially allocates the orders of execution sequence to the respective processing modules.

10 Claims, 15 Drawing Sheets

FIG. 2

| PROCESSING MODULE | INPUT | OUTPUT |
|---|---|---|
| A | X4,X6 | X1 |
| B | X1,X5,X8 | X2 |
| C | X2 | X3,X5,X6 |
| D | X3 | X4,X7 |
| E | X7 | NONE |
| F | NONE | X8 |

FIG. 3

| OUTPUT SIDE (ANTI DEPENDENCE SIDE) PROCESSING MODULE | INPUT SIDE (DEPENDENCE SIDE) PROCESSING MODULE |
|---|---|
| A | B |
| B | C |
| C | A |
| C | B |
| C | D |
| D | A |
| D | E |
| F | B |

| PROCESSING MODULE | PROCESSING MODULE THAT HAS DEPENDENCE | PROCESSING MODULE THAT HAS ANTI DEPENDENCE | DEPENDENCE | ANTI DEPENDENCE |
|---|---|---|---|---|
| A | C,D | B | 2 | 1 |
| B | A,C,F | C | 3 | 1 |
| C | B | A,B,D | 1 | 3 |
| D | C | A,E | 1 | 2 |
| E | D | NONE | 1 | 0 |
| F | NONE | B | 0 | 1 |

FIG. 6

| PROCESSING MODULE | PROCESSING MODULE THAT HAS DEPENDENCE | PROCESSING MODULE THAT HAS ANTI DEPENDENCE | DEPENDENCE | ANTI DEPENDENCE | PRIORITY | EXECUTION ORDER |
|---|---|---|---|---|---|---|
| A | C,D | B | 2 | 1 | -4 | |
| B | A,C,F | C | 3 | 1 | -5 | |
| C | B | A,B,D | 1 | 3 | -1 | |
| D | C | A,E | 1 | 2 | -2 | |
| E | D | NONE | 1 | 0 | -3 | |
| F | NONE | B | 0 | 1 | 0 | 1 |

FIG. 7

| PROCESSING MODULE | PROCESSING MODULE THAT HAS DEPENDENCE (EXCLUDING ONE WHOSE EXECUTION ORDER HAS BEEN DETERMINED) | PROCESSING MODULE THAT HAS ANTI DEPENDENCE (EXCLUDING ONE WHOSE EXECUTION ORDER HAS BEEN DETERMINED) | DEPENDENCE | ANTI DEPENDENCE | PRIORITY (ONE IS THE HIGHEST) | EXECUTION ORDER | NUMBER OF ONES DEPENDENT ON PROCESSING MODULE THAT HAS NOT BEEN DETERMINED |
|---|---|---|---|---|---|---|---|
| A | C,D | B | 2 | 1 | −3 | | |
| B | A,C | C | 2 | 1 | −3 | | |
| C | B | A,B,D | 1 | 3 | 0 | | |
| D | C | A,E | 1 | 2 | −1 | | |
| E | D | NONE | 1 | 0 | −2 | 2 | 1 |
| F | NONE | B | 0 | 1 | | 1 | 0 |

F I G . 8

| PROCESSING MODULE | EXECUTION ORDER | NUMBER OF ONES DEPENDENT ON PROCESSING MODULE THAT HAS NOT BEEN DETERMINED |
|---|---|---|
| A | 4 | 0 |
| B | 5 | 0 |
| C | 2 | 1 |
| D | 3 | 0 |
| E | 6 | 0 |
| F | 1 | 0 |

F I G . 9
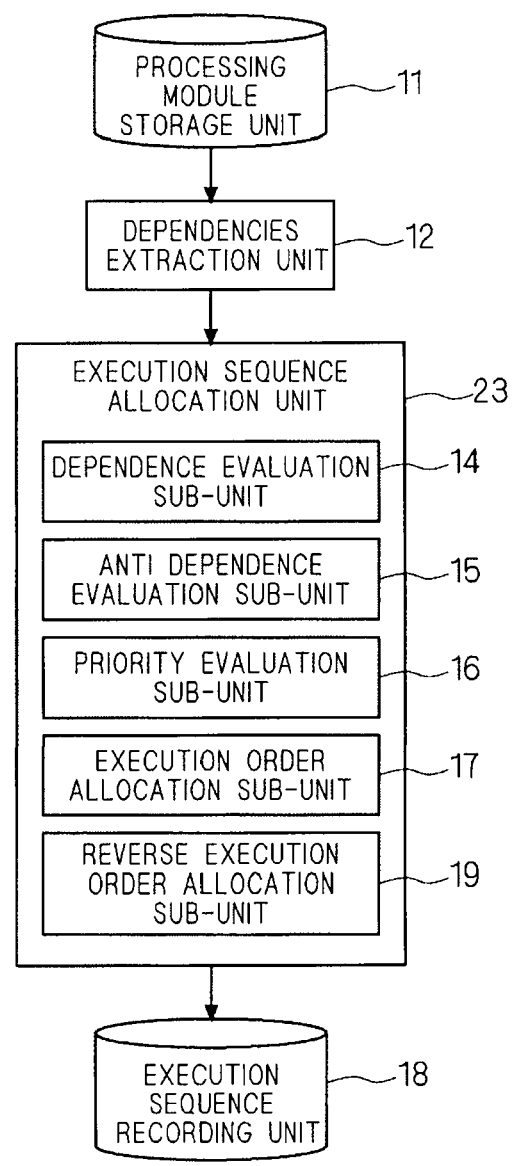

FIG. 10

| PROCESSING MODULE | PROCESSING MODULE THAT HAS DEPENDENCE | PROCESSING MODULE THAT HAS ANTI DEPENDENCE | DEPENDENCE | ANTI DEPENDENCE | EXECUTION ORDER (NEGATIVE NUMBER: FROM LAST) |
|---|---|---|---|---|---|
| A | C,D | B | 2 | 1 | |
| B | A,C,F | C | 3 | 1 | |
| C | B | A,B,D | 1 | 3 | |
| D | C | A,E | 1 | 2 | |
| E | D | NONE | 1 | 0 | |
| F | NONE | B | 0 | 1 | −1 |

FIG. 11

| PROCESSING MODULE | PROCESSING MODULE THAT HAS DEPENDENCE (EXCLUDING ONE WHOSE EXECUTION ORDER HAS BEEN DETERMINED) | PROCESSING MODULE THAT HAS ANTI DEPENDENCE (EXCLUDING ONE WHOSE EXECUTION ORDER HAS BEEN DETERMINED) | DEPENDENCE | ANTI DEPENDENCE | EXECUTION ORDER (NEGATIVE NUMBER: FROM LAST) |
|---|---|---|---|---|---|
| A | C,D | B | 2 | 1 | |
| B | A,C,F | C | 3 | 1 | |
| C | B | A,B,D | 1 | 3 | |
| D | C | A | 1 | 1 | |
| E | D | NONE | 1 | 0 | |
| F | NONE | B | 0 | 1 | −1 |

| PROCESSING MODULE | EXECUTION ORDER (NEGATIVE NUMBER: FROM LAST) | NUMBER OF ONES DEPENDENT ON PROCESSING MODULE THAT HAS NOT BEEN EXECUTED |
|---|---|---|
| A | -3 | 0 |
| B | -2 | 0 |
| C | 2 | 1 |
| D | -4 | 0 |
| E | -1 | 0 |
| F | 1 | 0 |

F I G . 1 4

| PROCESSING MODULE | EXECUTION ORDER | NUMBER OF ONES DEPENDENT ON PROCESSING MODULE THAT HAS NOT BEEN EXECUTED |
|---|---|---|
| A | 7 | 0 |
| B | 8 | 0 |
| C | 6 | 1 |
| D | 2 | 1 |
| E | 3 | 0 |
| F | 1 | 0 |
| G | 4 | 0 |
| H | 5 | 0 |

F I G . 1 5

| PROCESSING MODULE | EXECUTION ORDER (NEGATIVE NUMBER: FROM LAST) | NUMBER OF ONES DEPENDENT ON PROCESSING MODULE THAT HAS NOT BEEN EXECUTED |
|---|---|---|
| A | -5 | 0 |
| B | -4 | 0 |
| C | 2 | 1 |
| D | -6 | 0 |
| E | -1 | 0 |
| F | 1 | 0 |
| G | -2 | 0 |
| H | -3 | 0 |

FIG. 17

| PROCESSING MODULE | PROCESSING MODULE THAT HAS DEPENDENCE | PROCESSING MODULE THAT HAS ANTI DEPENDENCE | DEPENDENCE | ANTI DEPENDENCE | PRIORITY |
|---|---|---|---|---|---|
| A | C,D | B | 2 | 1 | -199 |
| B | A,C,F | C | 3 | 1 | -299 |
| C | B | A,B,D | 1 | 3 | -97 |
| D | C | A,E | 1 | 2 | -98 |
| E | D | NONE | 1 | 0 | -100 |
| F | NONE | B | 0 | 1 | 1 |

EXECUTION ORDER DECISION DEVICE

TECHNICAL FIELD

The present invention relates to an execution sequence decision device that determines the sequence of executing a plurality of processing modules dependent on each other.

BACKGROUND ART

In monitoring and control fields, the processing module that has conventionally been assembled by hardware is executed by a digital computer in more and more cases. In this case, the processing module performs an identical processing to that of hardware by being packaged as software and being executed routinely by a digital computer. In a case of a plurality of processing modules to be executed by one computer, the processing is performed by routinely executing an operation of executing those in full sequence.

For example, Patent Document 1 gives a description of the method of determining an execution sequence of logic elements shown in the diagram illustrating software. In Patent Document 1, the shown information extraction unit extracts the logic elements and the relation of connection thereamong from the figures, the logic information group generation unit divides the logic elements into the logic information groups in which the execution orders are uniquely determined, and further the execution sequence decision unit assigns priorities to the logic information groups, whereby the execution sequence of logic elements is determined. When the logic elements are replaced with processing modules and the relation of connection is replaced with the (input/output) dependencies, Patent Document 1 can be used in the determination of the sequence of executing a plurality of processing modules dependent on each other.

Patent Document 1: Japanese Patent Application Laid-Open No. 05-88869 (1993)

DISCLOSURE OF INVENTION

Problems to be Solved by the Invention

Unfortunately, in a case where the logic circuit has feedback, the logic information group generation unit disclosed in Patent Document 1 cannot extract the logic information group in which execution orders are uniquely determined, and accordingly cannot determine the execution sequence.

Similarly, in Patent Document 1, the execution sequence is not provided to the processing modules that have a closed circuit in the dependencies thereof. The simplest example is that two processing modules have the closed circuit in dependencies when those are dependent on each other. This occurs in, for example, two processing modules that exchange signals.

The present invention has been made to solve the above-mentioned problems, and an object thereof is to obtain an execution sequence decision device that, when processing modules dependent on each other are executed, efficiently and appropriately determines the execution sequence of processing modules even in a case where those have a closed circuit in the dependencies thereof.

Means to Solve the Problems

An execution sequence decision device according to the present invention determines, for a plurality of processing modules each having at least one of a data input function and a data output function, an execution sequence of the plurality of processing modules, which includes: a processing module storage unit storing processing module group data in which details of the plurality of processing modules are defined; an input/output dependencies extraction unit extracting input/output dependencies of the plurality of processing modules from the processing module group data; and an execution sequence allocation unit obtaining dependence and anti dependence of each of the plurality of processing modules on the other processing module from the input/output dependencies of the plurality of processing modules, and determining the execution sequence of the plurality of processing modules based on the dependence and anti dependence.

Effects of the Invention

According to the present invention, the execution sequence allocation unit determines the execution sequence of a plurality of processing modules based on the dependence and anti dependence of each of a plurality of processing modules on the other processing module.

Accordingly, the execution sequence decision device of the present invention takes the input/output dependencies into consideration, and thus achieves the effect that the execution sequence of a plurality of processing modules can be determined efficiently and appropriately even in a case where those has a closed circuit in the input/output dependencies.

BRIEF DESCRIPTION OF DRAWINGS

FIG. 2 is an explanatory diagram showing, in tabular form, an example of a processing module group stored in a processing module storage shown in FIG. 1.

FIG. 3 is an explanatory view showing, in tabular form, dependencies extracted by a dependencies extraction unit shown in FIG. 1.

FIG. 6 is an explanatory diagram showing, in tabular form, an example of processing results of priority decision and execution order allocation by a priority evaluation sub-unit and an execution order allocation sub-unit shown in FIG. 1.

FIG. 7 is an explanatory diagram showing, in tabular form, the execution order allocation results of an execution sequence allocation unit for a processing module group excluding part of the processing modules.

FIG. 8 is an explanatory view showing, in tabular form, the execution orders of processing modules whose execution order has been finally determined by the execution sequence allocation unit shown in FIG. 1 and the numbers of ones dependent on processing module that has not been determined.

FIG. 9 is a block diagram showing the configuration of an execution sequence decision device according to a second embodiment of the present invention.

FIG. 10 is an explanatory diagram schematically showing the details of the final execution order allocation by a reverse execution order allocation unit shown in FIG. 9.

FIG. 11 is an explanatory diagram showing, in tabular form, the results of execution sequence allocation by an execution sequence allocation unit for a processing module group excluding part of the processing modules.

FIG. 14 is an explanatory diagram showing, for example, the execution orders of the processing modules whose execution order has been finally determined for the processing module group shown in FIG. 13 in the first embodiment.

FIG. 15 is an explanatory diagram showing, for example, the execution orders of the processing modules whose execution order has been finally determined for the processing module group shown in FIG. 13 in the second embodiment.

FIG. 17 is an explanatory diagram showing, in tabular form, an example of priority decision by a priority evaluation sub-unit shown in FIG. 16.

BEST MODES FOR CARRYING OUT THE INVENTION

<Underlying Technology>

Generally in a case where an execution sequence is determined for a plurality of processing modules that have a closed circuit is provided in input/output dependencies, processing is inevitably executed on part of the processing modules, with the output determined in the former cycle being an input. While, the following problems arise in a case where the execution sequence is determined irrespective of the input/output dependencies.

The first problem is a delay. When the other processing module that uses the output of a certain processing module performs execution first, the output of the certain processing module is processed with the signal of the former cycle, and accordingly a delay occurs before appropriate processing is performed.

Figure 19:
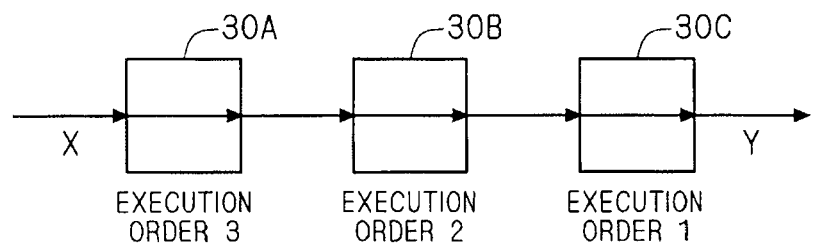
FIG. 19 is an explanatory diagram schematically showing, for example, the input/output dependencies of processing modules.

FIG. 19 is an explanatory diagram schematically showing the input/output dependencies and the execution sequence of processing modules 30A to 30C. As shown in this figure, the output of the processing module 30B depends on the output of the processing module 30A, and output data Y of the processing module 30C depends on the output of the processing module 30B. Then, as shown in FIG. 19, the execution sequence is determined in order of the processing modules 30C, 30B and 30A. Note that the processing modules 30A to 30C each have the function of holding input data for one cycle and outputting it as output data. Further, the processing module 30A receives input data X.

In the case of the above-mentioned processing modules 30A to 30C, there occurs a delay in such a manner that a change of the data X input to the processing module 30A is propagated to a change of the data Y output from the processing module 30C for as much as three cycles.

Figure 20:
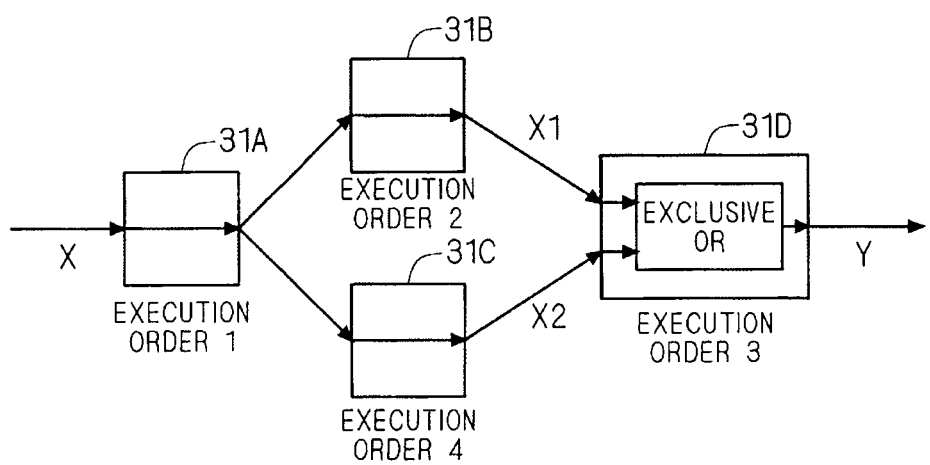
FIG. 20 is an explanatory diagram schematically showing, for example, the input/output dependencies of other processing modules.

FIG. 20 is an explanatory diagram schematically showing the input/output dependencies and the execution sequence of processing modules 31A to 31D. As shown in this figure, output data X1 of the processing module 31B depends on the output of the processing module 31A, output data X2 of the processing module 31C depends on the output of the processing module 31A, and output data Y of the processing module 31D depends on the data X1 of the processing module 31B and the data X2 of the processing module 31C. Then, the execution sequence is determined in order of the processing modules 31A, 31B, 31D and 31C.

Note that the processing modules 31A to 31C each have the function of holding the input data for one cycle and then outputting it, and the processing module 31D has the function of outputting the exclusive OR of the data X1 and the data X2 as the data Y. Further, the processing module 31A receives the input data X.

In the case of the above-mentioned processing modules 31A to 31D, the data X1 and the data X2 take the same value even when X changes, and accordingly Y seems to remain "0". In actuality, however, "1" may be output for a time period of one cycle. This is because, when the processing module 31D is executed, X2 is identical to X of the former cycle though the data X1 is identical to X of the cycle.

The case where the execution sequence of the processing modules 31A to 31D is not properly determined as described above may lead to a case where the results contrary to the logical judgment that can be understood at an intuitive level (hereinafter, referred to as "logical judgment at an intuitive level") occur.

An execution sequence decision device according to the present invention is configured to prevent the generation of a delay and the results contrary to the logical judgment at an intuitive level, which has been descried in the underlying technology, and to efficiently and appropriately determine the orders of execution of a plurality of processing modules dependent on each other.

<First Embodiment>

Figure 1:
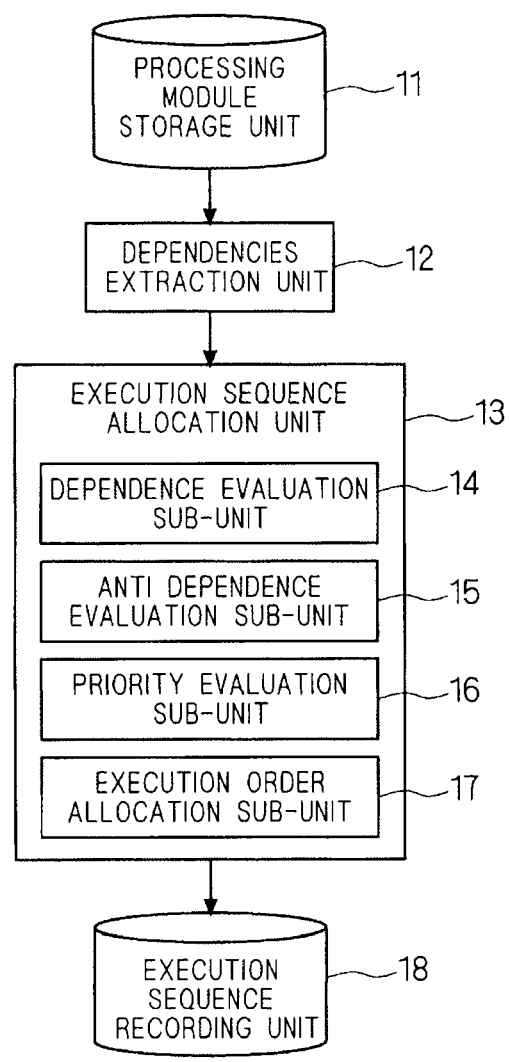
FIG. 1 is a block diagram showing the configuration of an execution sequence decision device according to a first embodiment of the present invention.

FIG. 1 is a block diagram showing the configuration of an execution sequence decision device according to a first embodiment of the present invention. As shown in this figure, the execution sequence decision device according to the first embodiment includes a processing module storage unit 11, a dependencies extraction unit 12, an execution sequence allocation unit 13 and an execution sequence recording unit 18.

The processing module storage unit 11 stores processing module group data that defines the input/output dependencies of a plurality of processing modules to be subjected to execution sequence decision, the details of the processing of each of the plurality of processing modules and the like. Note that the processing module described in this case refers to, for example, logic element or the like at a hardware level and refers to subroutine or the like having at least one of a data input function and a data output function at a software level. Hereinafter, the entirety of a plurality of processing modules is represented by a processing module group in some cases.

FIG. 2 is an explanatory diagram showing, in tabular form, an example of the processing module group data stored in the processing module storage unit 11. In the example shown in this figure, the input/output relations of six processing modules A to F are stored as the processing module group data.

The input and output of the processing module are represented by Xn (n=1, 2 . . . ). The processing module that has the data Xn as input (receives data Xn) depends on the processing module that has the data Xn as output (outputs the data Xn).

For example, the processing module A receives the output data X6 of the processing module C and the output data X4 of the processing module D, and accordingly depends on the processing modules C and D. On the other hand, the processing module A outputs the output data X1 as the input data of the processing module B, and accordingly causes the processing module B to depend thereon (has an anti dependence).

The dependencies extraction unit 12 extracts the input/output dependencies of a plurality of processing modules from the processing module group data stored in the processing module storage unit 11.

FIG. 3 is an explanatory diagram showing, in tabular form, the input/output dependencies of a plurality of processing modules extracted by the dependencies extraction unit 12. As shown in this figure, the dependencies of a plurality of processing modules are obtained by determining the processing modules that have the respective data Xn (n=1, 2 . . . ) as input and output and then combining those, as described above.

It is defined in the example shown in this figure that the processing module A is an anti dependence side (side that has an anti dependence) for the processing module B and is a dependence side (side that has a dependence) for the processing modules C and D. Hereinafter, for the sake of description, being the dependence side is referred to as "having a dependence" and being the anti dependence side is referred to as "having an anti dependence" in an abbreviated manner in some cases.

Figures 4, 5:
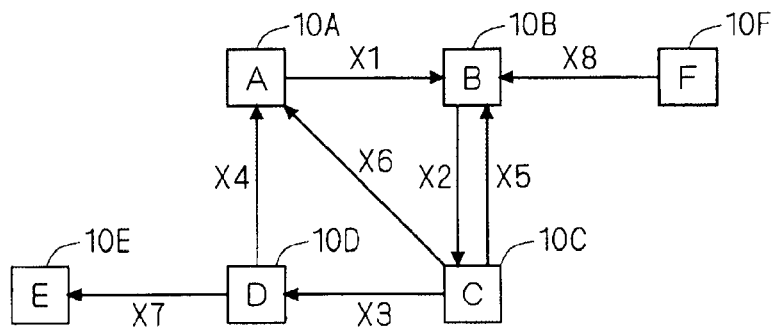
FIG. 4 is an explanatory diagram schematically showing the input/output dependencies of a plurality of processing modules, which are defined by the processing module group data stored in the processing module storage shown in FIG. 1.
FIG. 5 is an explanatory diagram showing, in tabular form, the evaluation results of the dependence and anti dependence by a dependence evaluation sub-unit and a reverse dependence evaluation sub-unit shown in FIG. 1.

FIG. 4 is an explanatory diagram schematically showing the input/output dependencies of a plurality of processing modules defined by the processing module group data stored in the processing module storage unit 11.

As shown in this figure, there are the input/output dependencies of the processing modules 10A to 10F (equivalent to the processing modules A to F of FIG. 2 and FIG. 3).

Specifically, the processing module 10A has a dependence on the processing modules 10C and 10D in such a manner of receiving the data X6 and X4 from the processing modules 10C and 10D, and has an anti dependence on the processing module 10B in such a manner of outputting the data X1 to the processing module 10B.

The processing module 10B has a dependence on the processing modules 10A, 10C and 10F in such a manner of receiving the data X1, X5 and X8 from the processing modules 10A, 10C and 10F, and has an anti dependence on the processing module 10C in such a manner of outputting the data X2 to the processing module 10C.

Similarly, the processing module 10C has a dependence on the processing module 10B and has an anti dependence on the processing modules 10A, 10B and 10D, and the processing module 10D has a dependence on the processing module 10C and has an anti dependence on the processing modules 10A and 10E. Further, the processing module 10E has a dependence on the processing module 10D, and the processing module 10F has an anti dependence on the processing module 10B.

As described above, in FIG. 4, the input/output dependencies of a plurality of processing modules are indicated by arrows from the processing modules which have an anti dependence to the processing modules which have a dependence.

The execution sequence allocation unit 13 includes a dependence evaluation sub-unit 14, an anti dependence evaluation sub-unit 15, a priority evaluation sub-unit 16 and an execution order allocation sub-unit 17.

The dependence evaluation sub-unit 14 evaluates the degree of dependence of each processing module on the other processing module in the processing module group as dependence.

The anti dependence evaluation sub-unit 15 evaluates the degree of anti dependence (having an anti dependence) of each processing module on the other processing module as anti dependence.

FIG. 5 is an explanatory diagram showing, in tabular form, the evaluation results of the dependence and anti dependence by the dependence evaluation sub-unit 14 and the anti dependence evaluation sub-unit 15. In the example shown in FIG. 5, the number of other processing modules that have a dependence is represented as the dependence, whereas the number of other processing modules that have anti dependence is represented as the anti dependence.

With reference to FIG. 5, for example, the processing module A has a dependence on the processing modules C and D where the dependence is "2", and has an anti dependence on the processing module B where the anti dependence is "1".

The priority evaluation sub-unit 16 determines the priority of each processing module in the processing module group based on the dependence and anti dependence obtained by the dependence evaluation sub-unit 14 and the anti dependence evaluation sub-unit 15.

The execution order allocation sub-unit 17 allocates the top order of execution sequence to one processing module with the highest priority obtained by the priority evaluation sub-unit 16.

FIG. 6 is an explanatory diagram showing, in tabular form, an example of processing results of the priority determination by the priority evaluation sub-unit 16 and the processing of allocating the execution sequence by the execution order allocation sub-unit 17.

In the example shown in FIG. 6, the priority evaluation sub-unit 16 evaluates (primarily evaluates) the processing module with lower dependence as higher (larger) priority. Then, as to the processing modules with the same dependence, the priority evaluation sub-unit 16 evaluates (secondarily evaluates) the processing module with larger anti dependence as higher (larger) priority. As a result, the priority evaluation sub-unit 16 determines the priorities in order of the processing modules F, C, D, E, A and B.

The reason why the processing module with large anti dependence is given priority in the secondary evaluation is that through the execution of such a processing module, the number of processing modules being not dependent on the processing module, which has not been executed, is expected to increase further.

After obtaining the priorities shown in FIG. 6, the execution order allocation sub-unit 17 determines the execution order of the processing module F with the highest priority as "1".

The execution sequence allocation unit 13 causes the dependence evaluation sub-unit 14, anti dependence evaluation sub-unit 15, priority evaluation sub-unit 16 and execution order allocation sub-unit 17 to repeatedly execute the above-mentioned process every time the execution order of one processing module is determined, and sequentially allocates orders of the execution sequence to the processing modules.

In this case, the processing module whose execution order has been determined is excluded from the targets. For example, after the execution order of the processing module F is determined as "1" in accordance with the priorities shown in FIG. 6, the processing module F is excluded from the targets of the processing module group.

As described above, while the six processing modules A to F are a predetermined number of processing modules to be evaluated in an initial state, at this timing, the execution sequence allocation unit 13 executes the target processing modules re-set processing of re-setting the five processing modules A to E as a predetermined number of processing modules to be evaluated.

Description is given below of the processing for the processing module group (a predetermined number of processing modules) excluding the processing module F.

FIG. 7 is an explanatory diagram showing, in tabular form, the execution order allocation results by the execution sequence allocation unit 13 for the processing module group excluding the processing module F.

The dependence evaluation sub-unit 14 and the anti dependence evaluation sub-unit 15 evaluate the dependence and anti dependence again excluding the processing module F whose order has been allocated. The processing module F is excluded from the evaluation targets, and accordingly the dependence of the processing module B decreases from "3" to "2".

After that, the priority evaluation sub-unit 16 evaluates the priorities again based on the dependence and anti dependence newly obtained by the dependence evaluation sub-unit 14 and the anti dependence evaluation sub-unit 15. As a result of the dependence of the processing module B decreasing from "3" to "2", the priority of the processing module B becomes "−3" that is the same rank as that of the processing module A.

Next, the execution order allocation sub-unit 17 allocates, based on the priorities newly obtained by the priority evaluation sub-unit 16, the processing module to be executed second and the processing module to which the top order is allocated among a predetermined number of processing modules to be evaluated. In the example shown in FIG. 7, the priority order of the processing module C is determined as "2".

Thereafter, in a similar manner, the execution sequence allocation unit 13 controls the dependence evaluation sub-unit 14, the anti dependence evaluation sub-unit 15 and the priority evaluation sub-unit 16 to repeatedly execute the evaluations and the execution order allocation sub-unit 17 to repeatedly execute the allocation while excluding the processing module whose execution order has been determined from the targets (while executing target processing module re-set processing), with the result that orders of execution sequence are allocated to the processing modules of the processing module group one by one.

Note that in FIG. 7, the number of ones that depend on the processing module that has not been determined refers to the number of times when the processing module whose execution order has been determined depends the processing module whose execution order has not been determined. For example, the processing module F does not originally depend on any processing module, and accordingly its number is "0", whereas the number of the processing module C is "1" because the execution order of the processing module B on which it has a dependence has not been determined.

FIG. 8 is an explanatory diagram showing, in tabular form, the execution sequence of the processing modules A to F whose execution sequence has been finally determined by the execution sequence allocation unit 13 and the number of ones that depend on the processing module that has not been determined.

As shown in this figure, the execution sequence is finally determined in order of the processing modules F, C, D, A, B and E. Then, the number of ones that depend on the processing module that has not been determined is limited only to "1" of the processing module C, and the other processing modules A, B and D to F are set to "0".

The execution sequence recording unit 18 records the execution sequence of the respective processing modules in the processing module group, which has been obtained by the execution sequence allocation unit 13.

As described above, the execution sequence decision device according to the first embodiment sequentially determines the orders of execution sequence of a plurality of processing modules in consideration of the dependence, which achieves the effect that an efficient and appropriate execution sequence can be obtained in which an execution delay is small and the results opposite to the logical determination at an intuitive level seldom occur.

In the example shown in FIG. 2 to FIG. 8, the processing module group is executed in accordance with the execution sequence determined by the execution sequence decision device according to the first embodiment, whereby the efficient execution sequence is obtained in which the number of ones that depend on the processing module that has not been determined, that is, the number of ones that depend on the results of the processing module of the former cycle is limited only to one when the processing module C is executed. Accordingly, in a case where the processing module is software, it is possible to prevent the generation of bug and increase production efficiency.

Note that in the present embodiment, the details of the processings of the dependence evaluation sub-unit 14, the anti dependence evaluation sub-unit 15, the priority evaluation sub-unit 16 and the execution order allocation sub-unit 17 are not limited to the details described above.

For example, the case where the dependencies are weighted, for example, the execution sequence of part of the processing modules is limited (for example, the processing modules A and B are successively executed without fail) in the dependence evaluation sub-unit 14 and the anti dependence evaluation sub-unit 15 is taken as an example, where evaluations may be made while taking those weights into account.

Alternatively, any evaluation formula may be used, evaluation may be made in consideration of other indicator, or a plurality of evaluation methods may be used through switching in the priority evaluation sub-unit 16. Further, in a case where there is no difference in the priorities evaluated by the priority evaluation sub-unit 16, the execution order allocation sub-unit 17 may select one processing module by any means (for example, from random number, the first or the last).

As described above, in the execution sequence decision device according to the first embodiment, the execution sequence allocation unit 13 determines the execution sequence of a plurality of processing modules based on the dependence and anti dependence of each of the plurality of processing modules on the other processing module.

The processing modules whose execution sequence is determined by this device may be ones in which the input thereof is, for example, a signal from a temperature, pressure or position sensor or man-machine interface and the output thereof is, for example, a control signal to a valve, pump, switch or man-machine interface in monitoring and control fields or the like. Alternatively, the processing modules may be ones in which the input thereof is, for example, a signal from a temperature, pressure or position sensor or man-machine interface and the output thereof is, for example, a control signal to a motor, relay circuit or the like or a man-machine interface. The same holds true for the embodiments below.

As a result, the execution sequence decision device according to the first embodiment achieves the effect of efficiently and appropriately determining the execution sequence of a plurality of processing modules by taking the input/output dependencies of the processing modules into account even in a case where those have a closed circuit in the input/output dependencies.

In addition, the execution sequence allocation unit 13 of the execution sequence decision device according to the first embodiment controls each of the dependence evaluation sub-unit 14, the anti dependence evaluation sub-unit 15, the priority evaluation sub-unit 16 and the execution order allocation sub-unit 17 so as to again perform the processing for a predetermined number of processing modules to be evaluated that are newly set after the target processing module re-set process, which achieves the effect that the execution sequence of processing modules can be always determined based on highly accurate priority.

Further, the execution sequence decision device according to the first embodiment includes the processing module storage unit 11 and the execution sequence recording unit 18, and accordingly is capable of stably holding the data regarding a plurality of processing modules before the execution by the dependencies extraction unit 12 and the execution sequence allocation unit 13 and the execution sequence after the decision by the execution sequence allocation unit 13.

<Second Embodiment>

FIG. 9 is a block diagram showing the configuration of an execution sequence decision device according to a second embodiment of the present invention. As shown in this figure, the execution sequence decision device according to the second embodiment includes the processing module storage unit 11, the dependencies extraction unit 12, an execution sequence allocation unit 23 and the execution sequence recording unit 18.

The execution sequence allocation unit 23 includes the dependence evaluation sub-unit 14, the anti dependence evaluation sub-unit 15, the priority evaluation sub-unit 16, the execution order allocation sub-unit 17 and a reverse execution order allocation sub-unit 19.

The reverse execution order allocation sub-unit 19 allocates the orders of execution to the processing modules in order from the last based on the anti dependence obtained by the anti dependence evaluation sub-unit 15. In the present embodiment, one with the anti dependence of "0" is extracted and allocated. On this occasion, the processing by the reverse execution order allocation sub-unit 19 is executed in preference to the processings by the priority evaluation sub-unit 16 and the execution order allocation sub-unit 17.

Note that the processings of the processing module storage unit 11, the dependencies extraction unit 12 and the execution sequence recording unit 18 and the details of the processings of the dependence evaluation sub-unit 14, the anti dependence evaluation sub-unit 15, the priority evaluation sub-unit 16 and the execution order allocation sub-unit 17 in the execution sequence allocation unit 23 are basically identical to those of the first embodiment, and thus those are denoted by the same symbols and description thereof is appropriately omitted.

FIG. 10 is an explanatory diagram schematically showing the details of finally allocating the execution orders by the reverse execution order allocation sub-unit 19. Note that the target processing module group is identical to the processing module group having the input/output dependencies shown in FIG. 2 to FIG. 4.

As shown in this figure, the dependence evaluation sub-unit 14 and the anti dependence evaluation sub-unit 15 evaluate the dependence and anti dependence of the processing modules A to F as in the first embodiment.

As a result, there exists the processing module E with the anti dependence of "0" as shown in FIG. 10, and thus the reverse execution order allocation sub-unit 19 allocates "−1" indicating that the processing module E is executed last in the sequence in preference to the processings by the priority evaluation sub-unit 16 and the execution order allocation sub-unit 17.

The execution sequence allocation unit 23 causes the dependence evaluation sub-unit 14, the anti dependence evaluation sub-unit 15, the priority evaluation sub-unit 16, the execution order allocation sub-unit 17 and the reverse execution order allocation sub-unit 19 to repeatedly execute the above-mentioned process every time the order of execution sequence of one processing module is determined, and sequentially allocates the orders of execution sequence to the processing modules.

In this case, the processing module whose order of execution sequence has been determined is excluded from the targets as in the first embodiment. For example, after the execution order of the processing module E is determined as "−1" (last) by the reverse execution order allocation sub-unit 19 as shown in FIG. 0, the processing module E is excluded from the targets of the processing module group.

The processing for the processing module group (a predetermined number of processing modules) excluding the processing module E is described below.

FIG. 11 is an explanatory diagram showing, in tabular form, the results of allocating the orders of execution sequence to the processing module group excluding the processing module E by the execution sequence allocation unit 23.

The dependence evaluation sub-unit 14 and the anti dependence evaluation sub-unit 15 evaluate the dependence and anti dependence excluding the processing module E to which an order of execution sequence has been allocated. The processing module E is excluded from the evaluation targets, and accordingly the anti dependence of the processing module D decreases from "2" to "1".

On that occasion, there is no processing module whose anti dependence is "0", and thus the reverse execution order allocation sub-unit 19 dose not perform the allocation processing, and the priority evaluation sub-unit 16 and the execution order allocation sub-unit 17 execute the execution sequence determination processing as in the first embodiment.

The priority evaluation sub-unit 16 evaluates the priorities again based on the dependence and anti dependence newly obtained by the dependence evaluation sub-unit 14 and the anti dependence evaluation sub-unit 15. Then, the priority evaluation sub-unit 16 evaluates the priority of the processing module F with the smallest dependence "0" as the highest level.

Next, the execution order allocation sub-unit 17 determines the processing module to be executed first based on the priorities obtained by the priority evaluation sub-unit 16. In the example shown in FIG. 11, the execution order of the processing module F is determined as "1".

Hereinafter, in a similar manner, the execution sequence allocation unit 23 causes the dependence evaluation sub-unit 14, the anti dependence evaluation sub-unit 15 and the priority evaluation sub-unit 16 to repeatedly execute the evaluations and the execution order allocation sub-unit 17 and the reverse execution order allocation sub-unit 19 to repeatedly execute the allocation while excluding the processing module whose order of execution sequence has been determined, thereby allocating the orders of executing sequence to the processing modules of the processing module group one by one.

Figures 12, 13:
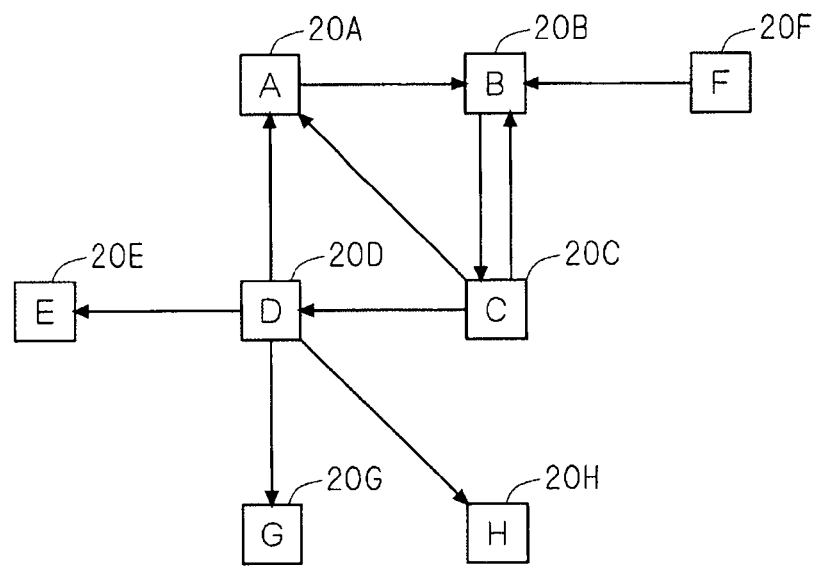
FIG. 12 is an explanatory diagram showing, in tabular form, the execution orders of processing modules A to F whose execution order has been finally determined by the execution sequence allocation unit shown in FIG. 9 and the numbers of ones dependent on the processing module that has not been determined.
FIG. 13 is an explanatory diagram schematically showing the input/output dependencies of a plurality of processing modules defined by other processing module group data stored in the processing module storage shown in FIG. 9.

FIG. 12 is an explanatory diagram showing, in tabular form, the execution orders of the processing modules A to F whose execution order has been finally determined by the execution sequence allocation unit 23 and the number of ones that depend on the processing module that has not been determined. Note that in FIG. 12, the orders of execution sequence are in order of −4, −3, −2 and −1 in a case of negative number.

As shown in this figure, the orders of execution sequence are finally determined in order of the processing modules F, C, D, A, B and E. In addition, the number of ones that depend on the processing module that has not been determined is limited only to "1" of the processing module C, and the other processing modules A, B and D to F are set to "0".

As described above, the execution sequence decision device according to the second embodiment determines the execution orders of the processing modules generally in consideration of the dependence as in the first embodiment. As a result, this achieves the effect that the execution sequence can be obtained in which an execution delay is small and the results contrary to the logical judgment at an intuitive level seldom occur.

As described above, the processing module group is executed in accordance with the execution sequence determined by the execution sequence decision device according to the second embodiment, whereby the efficient execution sequence is obtained in which the number of ones that depend on the processing module that has not been determined, that is, the number of ones that depend on the results of the processing modules of the former cycle is limited only to one when the processing module C is executed.

In the processing module group that has the input/output dependencies shown in FIG. 2 to FIG. 4, the same execution sequence is obtained in the first embodiment and the second embodiment. However, the second embodiment is effective in the processing module group that has more intricate input/output dependencies among the processing modules.

FIG. 13 is an explanatory diagram schematically showing the input/output dependencies of the other processing module group data stored in the processing module storage unit 11.

As shown in this figure, there are the following input/output dependencies among processing modules A to H in the other processing module group.

The processing module 20A has a dependence on the processing modules 20C and 20D and has an anti dependence on the processing module 20B. The processing module 20B has a dependence on the processing modules 20A, 20C and 20F and has an anti dependence on the processing module 20C.

In a similar manner, the processing module C has a dependence on the processing module 20B and has an anti dependence on the processing modules 20A, 20B and 20D, and the processing module 20D has a dependence on the processing module 20C and has an anti dependence on the processing modules 20A, 20E, 20G and 20H. Further, the processing module 20E has a dependence on the processing module 20D, and the processing module 20F has an anti dependence on the processing module 20B.

In addition, the processing module 20G has a dependence on the processing module 20D, and the processing module 20H has a dependence on the processing module 20D.

FIG. 14 is an explanatory diagram showing, in tabular form, the execution orders of the processing modules A to H whose execution sequence has been finally determined and the number of ones that depend on the processing module that has not been determined for the processing module group that has the input/output dependencies shown in FIG. 13. Note that the execution order of the processing module, which is earlier in alphabetical order, is determined prior to the other on the same conditions.

FIG. 15 is an explanatory diagram showing, in tabular form, the execution orders of the processing modules A to H whose execution sequence has been finally determined and the number of ones that depend on the processing module that has not been determined for the processing module group that has the input/output dependencies shown in FIG. 13 in the second embodiment. Note that in FIG. 15, the orders of execution sequence are in order of −6, −5, −4, −3, −2 and −1 in the case of negative number. Further, the execution order of the processing module, which is earlier in alphabetical order, is determined prior to the other on the same conditions.

As shown in FIG. 14 and FIG. 15, the sum of the numbers of ones that depend on the processing module that has not been determined is "2" in the execution sequence determined in the first embodiment, whereas the sum of the numbers of ones that depend on the processing module that has not been determined is "1" in the execution sequence determined in the second embodiment.

This difference is an effect obtained by in advance determining the orders of the processing modules E, G and H, which cause no problem even if they are determined last, sequentially from the last and excluding those from the candidates for the priority evaluation by the priority evaluation sub-unit 16 and the execution order allocation by the execution order allocation sub-unit 17.

As described above, the execution sequence decision device according to the second embodiment is capable of determining the execution sequence in order from the last by giving the priority to the processing module whose anti dependence is "0", which achieves the effect that the execution sequence is determined for the processing module group that has intricate input/output dependencies more efficiently compared with the first embodiment.

That is, when the condition (given condition) that the anti dependence is "0" is satisfied, the reverse execution order allocation sub-unit 19 in the execution sequence allocation unit 23 allocates the last order to the processing module with the anti dependence "0" among a predetermined number of processing modules to be evaluated in preference to the allocation by the priority evaluation sub-unit 16 and the execution order allocation sub-unit 17, which achieves the effect that the execution sequence can be determined efficiently even for a plurality of processing modules that have intricate input/output dependencies.

<Third Embodiment>

Figure 16:
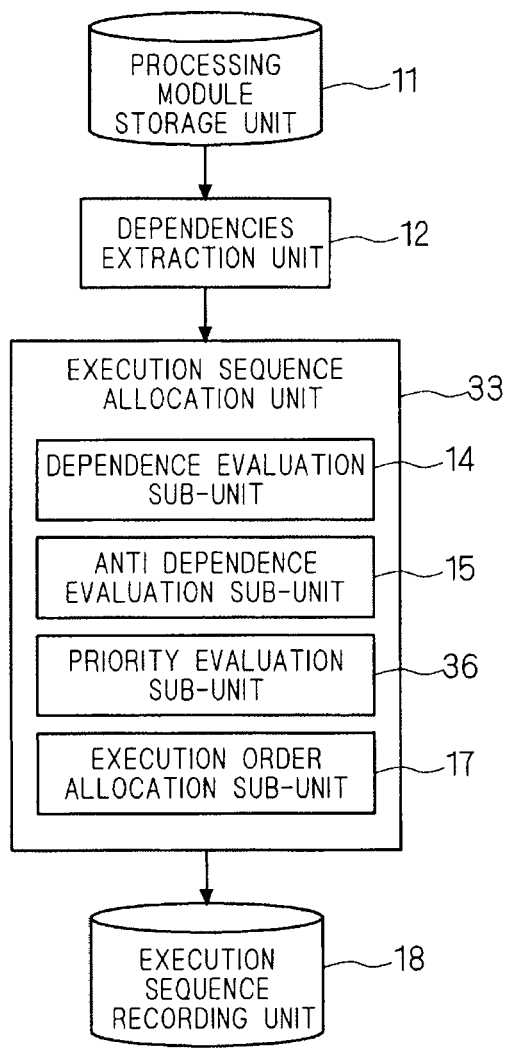
FIG. 16 is a block diagram showing the configuration of an execution sequence decision device according to a third embodiment.

FIG. 16 is a block diagram showing the configuration of an execution sequence decision device according to a third embodiment of the present invention. As shown in this figure, the execution sequence decision device according to the third embodiment includes the processing module storage unit 11, the dependencies extraction unit 12, an execution sequence allocation unit 33 and the execution sequence recording unit 18.

The execution sequence allocation unit 33 includes the dependence evaluation sub-unit 14, the anti dependence evaluation sub-unit 15, a priority evaluation sub-unit 36 and the execution order allocation sub-unit 17.

Note that the processings of the processing module storage unit 11, the dependencies extraction unit 12 and the execution sequence recording unit 18 and the details of the processings of the dependence evaluation sub-unit 14, the anti dependence evaluation sub-unit 15 and the execution order allocation sub-unit 17 in the execution sequence allocation unit 33 are basically identical to those of the first embodiment, and thus those are denoted by the same symbols and description thereof is appropriately omitted.

The priority evaluation sub-unit 36 evaluates the priority based on the dependence evaluated by the dependence evaluation sub-unit 14 and the anti dependence evaluated by the anti dependence evaluation sub-unit 15, with the use of the evaluation formula expressed by a polynomial of the dependence and anti dependence. An example of the evaluation formula is Expression (1) expressed by "(priority)=$\alpha \times$(dependence)+$\beta \times$(anti dependence) . . . (1)". In Expression (1), "$\alpha$" is a (first) parameter for "dependence" and "$\beta$" is a (second) parameter for "anti dependence".

The number of ones that depend on the processing module that has not been determined is prone to increase when one with large dependence is selected. On the other hand, the total number of the remaining processing modules that depend on each other is prone to decrease when one with large anti dependence is selected, and thus the number of ones that depend on the processing module that has not been determined is expected to decrease in the allocation thereafter.

In Expression (1), when K is a sufficiently large value and $\alpha = -K\beta$ ($\beta$ is a positive number), the details of the processing of the priority evaluation sub-unit 36 are identical to the details of the processing of the priority evaluation sub-unit 16 according to the first embodiment.

FIG. 17 is an explanatory diagram showing, in tabular form, an example of priority decision by the priority evaluation sub-unit 36. The example of FIG. 17 shows the priorities in a case of the processing module group shown in FIG. 2 to FIG. 4 where, for example, K=100 and $\beta$=1 in Expression (1). The priorities shown in FIG. 17 are in order of the processing modules F, C, D, E, A and B, and this priority sequence is the same as the priority sequence by the priority evaluation sub-unit 16 according to the first embodiment shown in FIG. 6.

As described above, the priority evaluation sub-unit 36 is capable of determining the priority of each processing module in a processing module group with the use of the evaluation formula (Expression (1)) where values of parameters ($\alpha$ and $\beta$) can be changed based on the dependence and anti dependence, and accordingly the execution sequence decision device according to the third embodiment achieves the effect that the execution sequence can be determined more flexibly compared with the first embodiment and the second embodiment.

That is, the priority evaluation sub-unit 36 of the execution sequence allocation unit 33 in the execution sequence decision device according to the third embodiment obtains the priorities of a predetermined number of processing modules to be evaluated based on Expression (1) (given polynomial) including the dependence and anti dependence and the parameters $\alpha$ and $\beta$ for dependence and anti dependence (first and second parameters), and accordingly is capable of obtaining flexible priorities with high accuracy. As a result, the execution sequence decision device according to the third embodiment achieves an effect that the execution sequence is determined efficiently for a plurality of processing modules.

In addition, the execution sequence decision device according to the third embodiment determines the execution sequence by appropriately changing $\alpha$ and $\beta$ of Expression (1), whereby a plurality of execution sequences can be obtained. Accordingly, the total numbers of ones that depend on the processing module that has not been determined are compared with each other, and the values of parameters $\alpha$ and $\beta$ are set based on the comparison results, whereby it is possible to determine the execution sequence efficiently and appropriately.

Moreover, as another aspect, it is conceivable to add a component equivalent to the reverse execution order allocation sub-unit 19 according to the second embodiment to the execution sequence allocation unit 33 according to the third embodiment.

<Fourth Embodiment>

Figure 18:
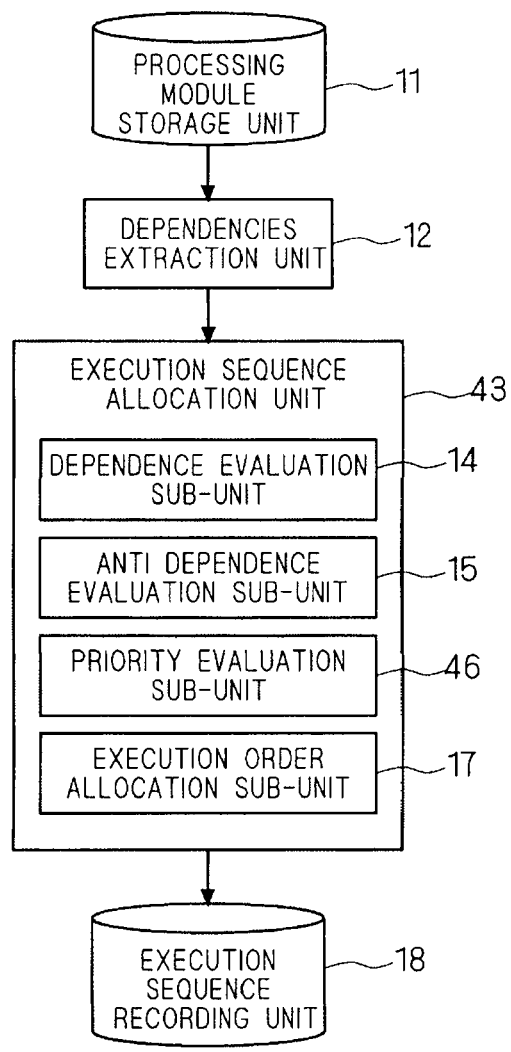
FIG. 18 is a block diagram showing the configuration of an execution sequence decision device according to a fourth embodiment.

FIG. 18 is a block diagram showing the configuration of an execution sequence decision device according to a fourth embodiment of the present invention. As shown in this figure, the execution sequence decision device according to the fourth embodiment includes the processing module storage unit 11, the dependencies extraction unit 12, an execution sequence allocation unit 43 and the execution sequence recording unit 18.

The execution sequence allocation unit 43 includes the dependence evaluation sub-unit 14, the anti dependence evaluation sub-unit 15, a priority evaluation sub-unit 46 and the execution order allocation sub-unit 17.

Note that the processings of the processing module storage unit 11, the dependencies extraction unit 12 and the execution sequence recording unit 18 and the contents of the processings of the dependence evaluation sub-unit 14, the anti dependence evaluation sub-unit 15 and the execution order allocation sub-unit 17 in the execution sequence allocation unit 43 are basically identical to those of the first embodiment, and thus those are denoted by the same symbols and description thereof is appropriately omitted.

Similarly to the priority evaluation sub-unit 36 according to the third embodiment, the priority evaluation sub-unit 46 evaluates the priorities with the use of the evaluation formula (Expression (1)) expressed by the polynomial of the dependence and anti dependence.

On this occasion, the execution sequence allocation unit 43 controls the dependence evaluation sub-unit 14, the anti dependence evaluation sub-unit 15, the priority evaluation sub-unit 46 and the execution order allocation sub-unit 17 with the use of each of multiple types of evaluation formulae, which are obtained by changing at least one of the parameters $\alpha$ and $\beta$ of Expression (1) multiple times by the priority evaluation sub-unit 46, to thereby provisionally determine multiple types of execution sequence candidates based on multiple types of evaluation formulae for a processing module group.

Then, the execution sequence allocation unit 43 adopts, as the finally determined execution sequence, the candidate with the smallest "number of ones that depend on the processing procedure that has not been determined" among the multiple types of execution sequence candidates that have been provisionally determined. Note that the multiple types of execution sequence candidates that have been provisionally determined may be temporarily recorded in the execution sequence recording unit 18.

As described above, the execution sequence allocation unit 43 of the execution sequence decision device according to the fourth embodiment adopts, as the finally determined execution sequence, the candidate with the smallest "number of ones that depend on the processing procedure that has not been determined" among multiple types of execution sequence candidates provisionally determined based on multiple types of evaluation formulae (polynomials), with the use of the evaluation formula (Expression (1)) in which the parameters (α and β) can be changed based on the dependence and anti dependence. Accordingly, the execution sequence decision device according to the fourth embodiment achieves an effect that the execution sequence can be determined more efficiently.

That is, the execution sequence allocation unit 43 of the execution sequence decision device according to the fourth embodiment finally determines, as the execution sequence of a plurality of processing modules, the candidate with the smallest "number of ones that depend on the processing procedure that has not been determined" (candidate judged as the most efficient execution sequence) among multiple types of execution sequence candidates provisionally determined, which achieves an effect that more efficient execution procedure can be determined.

Note that the following method is conceivable as the method of changing the evaluation criteria by the priority evaluation sub-unit 46 and obtaining multiple types of execution sequence candidates by the execution sequence allocation unit 43. The parameter set composed of a plurality of sets (in which each set includes combinations of multiple types of α and β) regarding the evaluation formula (Expression (1)) is prepared in advance as an aggregated database, correspondingly to the specifications of the processing module group (number of processing modules, average number of inputs/outputs).

Then, the parameter set complying with the specifications of the processing module group is read from a plurality of parameter sets in the aggregated database, and multiple types of execution sequence candidates are provisionally determined while changing the evaluation formula in accordance with the read parameter set.

Further, in a case where the tendency of the processing module group whose execution sequence is desired to be determined, such as the density of the input/output dependencies (average number of inputs/outputs) and the number of processing modules, is known, the determination of an efficient and appropriate execution sequence can be expected as long as an aggregated model of the processing module group similar to the above is generated and a parameter set optimum for the aggregated model is set in the priority evaluation sub-unit 46 as an aggregated database.

Further, in the case where one evaluation formula is required to be set in advance for prompt decision of an execution sequence, it is also possible to set one evaluation formula that has an optimum parameter in the priority evaluation sub-unit 46 by the pre-processing described below. That is, it is possible to obtain the execution sequence using multiple types of evaluation formulae for each processing module group in a set of processing module groups using multiple types of evaluation formulae, and preliminarily set, as one evaluation formula for the priority evaluation sub-unit 46, one evaluation formula in which an optimum execution sequence is determined among multiple types of evaluation formulae through averaging by the processing such as decision by majority.

Note that it is also conceivable that the component equivalent to the reverse execution order allocation sub-unit 19 according to the second embodiment may be added to the execution sequence allocation unit 43 according to the fourth embodiment.

<Others>

Note that the execution sequence decision devices described in the first embodiment to the fourth embodiment can be implemented by a computer device that is composed of, for example, a main storage, an arithmetic unit, an input device, a secondary storage, an output device and the like and has a configuration such that those devices are connected in common through, for example, a common bus.

In the above-mentioned computer device, the dependencies extraction unit 12 and the execution sequence allocation unit 13, 23, 33, 43 can be implemented upon an arithmetic unit operating based on the program for causing a computer to function. It is possible to store the above-mentioned program in a main storage or secondary storage.

Further, the processing module storage unit 11 and the execution sequence recording unit 18 can be implemented by a main storage or secondary storage.

While the invention has been shown and described in detail, the foregoing description is in all aspects illustrative and not restrictive. It is therefore understood that numerous modifications and variations can be devised without departing from the scope of the invention.

The invention claimed is:

1. An execution sequence decision device which determines, for a plurality of processing modules each having at least one of a data input function and a data output function, an execution sequence of said plurality of processing modules, comprising:
   a processing module storage unit that stores processing module group data in which contents of said plurality of processing modules are defined;
   an input/output dependencies extraction unit that extracts input/output dependencies of said plurality of processing modules from said processing module group data; and
   an execution sequence allocation unit
      that obtains dependence and anti-dependence of each processing module with respect to other processing modules based on the input/output dependencies of said plurality of processing modules, and
      that performs, via a processor, execution sequencing processing to determine the execution sequence of said plurality of processing modules based on said dependence and anti-dependence by sequentially determining an order of a predetermined number of processing modules within the execution sequence,
      wherein each time said execution sequence allocation unit allocates the order of a processing module within the execution sequence, the execution sequence allocation unit automatically excludes the processing module whose order of the execution sequence has been determined thereby resetting said predetermined number of processing modules anew, and performs execution sequencing processing again on the reset number of processing modules.

2. The execution sequence decision device according to claim 1, wherein said execution sequence allocation unit includes
   a dependence evaluation sub-unit that obtains the dependence of each of said predetermined number of processing modules on the other processing modules based on the input/output dependencies of said predetermined number of processing modules;
   an anti-dependence evaluation sub-unit that obtains the anti-dependence of each of said predetermined number of processing modules on the other processing modules based on the input/output dependencies of said predetermined number of processing modules;
   a priority evaluation sub-unit that obtains the priorities of said predetermined number of processing modules based on said dependence and said anti-dependence obtained by said dependence evaluation sub-unit and said anti-dependence evaluation sub-unit, respectively; and an execution order allocation sub-unit that allocates the top order of execution sequence to one processing module having the highest priority among said predetermined number of processing modules, wherein said execution sequence allocation unit controls said dependence evaluation sub-unit, said anti-dependence evaluation sub-unit, said priority evaluation sub-unit and said execution order allocation sub-unit to each execute the processing for said predetermined number of processing modules newly set after said resetting.

3. The execution sequence decision device according to claim 2, wherein said execution sequence allocation unit further includes a reverse execution order allocation sub-unit that allocates, when said anti-dependence satisfies a given condition, the last order to the processing module in which said anti-dependence satisfies said given condition among said predetermined number of processing modules in preference to the allocation by said execution order allocation sub-unit, based on said anti-dependence obtained by said anti-dependence evaluation sub-unit.

4. The execution sequence decision device according to claim 2, wherein said priority evaluation sub-unit obtains the priorities of said predetermined number of processing modules based on a given polynomial which includes said dependence and said anti-dependence obtained by said dependence evaluation sub-unit and said anti-dependence evaluation sub-unit, and first and second parameters for said dependence and said anti-dependence, respectively.

5. The execution sequence decision device according to claim 3, wherein said priority evaluation sub-unit obtains the priorities of said predetermined number of processing modules based on a given polynomial which includes said dependence and said anti-dependence obtained by said dependence evaluation sub-unit and said anti-dependence evaluation sub-unit, and first and second parameters for said dependence and said anti-dependence, respectively.

6. The execution sequence decision device according to claim 4, wherein:

said given polynomial includes a plurality of types of polynomials in which at least one of values of said first and second parameters is changed;

said execution sequence allocation unit causes said dependence evaluation sub-unit, said anti-dependence evaluation sub-unit and said execution order allocation sub-unit to execute process while causing said priority evaluation sub-unit to obtain the priorities of said predetermined number of processing modules based on each of said plurality of types of polynomials, to thereby provisionally determine a plurality of types of execution sequence candidates in said plurality of processing modules; and said execution sequence allocation unit determines, as the execution sequence of said plurality of processing modules, the candidate judged to be the most efficient execution sequence among said plurality of types of execution sequence candidates.

7. The execution sequence decision device according to claim 1, further comprising:

an execution sequence recording unit that records the execution sequence of said plurality of processing modules determined by said execution sequence allocation unit.

8. The execution sequence decision device according to claim 3, wherein the dependence identifies the number of input dependencies of the processing module with respect to other processing modules and the anti-dependence identifies the number of output dependencies of the processing module with respect to other processing modules.

9. A method for determining, for a plurality of processing modules each having at least one of a data input function and a data output function, an execution sequence of said plurality of processing modules, comprising:

storing processing module group data in which contents of said plurality of processing modules are defined;

extracting input/output dependencies of said plurality of processing modules from said processing module group data;

obtaining dependence and anti-dependence of each processing module with respect to other processing modules based on the input/output dependencies of said plurality of processing modules;

performing, via a processor, execution sequencing processing to determine the execution sequence of said plurality of processing modules based on said dependence and anti-dependence by sequentially determining an order of a predetermined number of processing modules within the execution sequence, wherein each time the order of a processing module is allocated within the execution sequence, the processing module whose order of the execution sequence has been determined is automatically excluded thereby resetting said predetermined number of processing modules anew, and the execution sequencing processing is performed again on the reset number of processing modules.

10. A non-transitory computer-readable medium having comuter-readable instructions thereon that when executed by a computer cause the computer to perform a method for determining, for a plurality of processing modules each having at least one of a data input function and a data output function, an execution sequence of said plurality of processing modules, the method comprising:

storing processing module group data in which contents of said plurality of processing modules are defined;

extracting input/output dependencies of said plurality of processing modules from said processing module group data;

obtaining dependence and anti-dependence of each processing module with respect to other processing modules based on the input/output dependencies of said plurality of processing modules;

performing execution sequencing processing to determine the execution sequence of said plurality of processing modules based on said dependence and anti-dependence by sequentially determining, via a processor, an order of a predetermined number of processing modules within the execution sequence, wherein each time the order of a processing module is allocated within the execution sequence, the processing module whose order of the execution sequence has been determined is automatically excluded thereby resetting said predetermined number of processing modules anew, and the execution sequencing processing is performed again on the reset number of processing modules.

* * * * *